Aug. 14, 1945.                R. J. WILLIAMS                2,382,930
                            LAMINATING APPARATUS
                            Filed Oct. 28, 1943            4 Sheets-Sheet 1

Russell J. Williams
Inventor.
Haynes and Koenig
Attorneys.

Aug. 14, 1945.   R. J. WILLIAMS   2,382,930
LAMINATING APPARATUS
Filed Oct. 28, 1943   4 Sheets-Sheet 2

Russell J. Williams,
Inventor.
Haynes and Koenig,
Attorneys.

Aug. 14, 1945.                R. J. WILLIAMS                2,382,930
                            LAMINATING APPARATUS
               Filed Oct. 28, 1943              4 Sheets-Sheet 3

Russell J. Williams,
Inventor.
Haynes and Koenig
Attorneys.

Patented Aug. 14, 1945

2,382,930

UNITED STATES PATENT OFFICE 2,382,930

LAMINATING APPARATUS

Russell J. Williams, Manhassett Village, Mo., assignor to Bemis Bro. Bag Company, St. Louis, Mo., a corporation of Missouri Application October 28, 1943, Serial No. 507,961

16 Claims. (Cl. 93—18)

This invention relates to laminating apparatus, and with regard to certain more specific features, to apparatus of this class for joining web materials by means of certain patterns of adhesive.

The invention is an improvement upon the apparatus disclosed in my United States Patent Application Serial No. 489,222, filed May 31, 1943, for Laminating apparatus.

Among the several objects of the invention may be noted the provision of laminating apparatus for continuously producing bag-like structures, such as case liners or bags per se, in which seams are made by inter-ply pasting; the provision of apparatus of the class described which will economically produce a fully seamed bag, including a protected portion at the mouth, through which filling may be accomplished and the bag thereafter closed in the field without further application of adhesive; the provision of apparatus of the class described which performs lamination, adhesive seaming, certain seam covering and bag separation in one continuous series of operations; and the provision of apparatus of this class which is very simple, easily controlled, reliable and economical. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention.

Similar reference characters indicate corresponding parts throughout the several views of the drawings.

Figure 1:
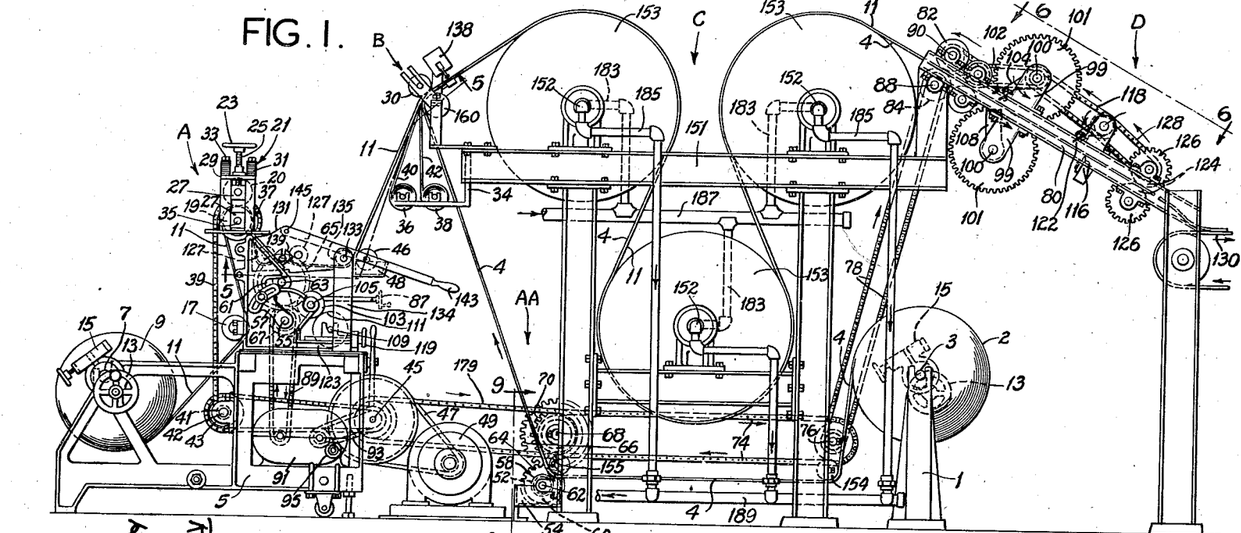
Fig. 1 is a side elevation of my new apparatus.

Referring now more particularly to Fig. 1, in general index character A shows a first adhesive-applying unit, AA a second adhesive-applying unit, B a laminating and tape-applying unit, C an adhesive-drying or adhesive-solidifying unit, and D a scoring, cut-off and delivery unit.

The adhesive-applying unit A consists of a frame 5 on which is a removable supporting shaft 7 for a supply roll 9 of paper, cloth or like web 11 to which adhesive is to be applied for lamination and bag formation. This shaft 7 is laterally adjustable in frame 5 from a control mechanism 13 for properly positioning the supply roll 9 so that the web 11 may be properly aligned in the machine. The mechanism 13 includes an adjustable tension brake 15 for providing proper tensioning reaction from the roll 9 on the web 11. Further description of the device 13, 15 will not be given, since its form and function are already known in the art.

At numeral 1 is shown a stand for another supporting shaft 3. This supports a supply roll 2 of paper, cloth or like web 4 which, as will be seen later, is provided with adhesive stripes in device AA and then laminated with the web 11 at B to form the desired case liners or bags. Associated with this shaft 3 is another control mechanism 13 for properly laterally positioning the supply roll 2 and another adjustable tension spring 15 for providing proper reaction from the roll 2 on the web 4. The web 4 passes forward under the drying unit C, through unit AA, and meets the web 11 at laminating and tape-applying unit B.

Returning to the web 11, it passes from the supply roll 9 behind an idler roller 17 and then up and over a lowermost one of a pair of draw rolls 19 and 20. The upper draw roll 20 is adjustably biased toward the lower draw roll 19 by a spring-pressure mechanism 21. This mechanism 21 includes adjusting wheels 23 which permit various degrees of pressure to be set up between the rolls 19, or no pressure at all. The mechanism 21 consists in screws 25 operating against sliding bearings 27 for the upper roll 20. These screws are threaded through plates 29 which are held down by springs 31 reacting the heads of fixed studs 33. Thus when desired, the pressure between rolls may be completely relaxed or adjusted to any desired practical value.

Figure 3:
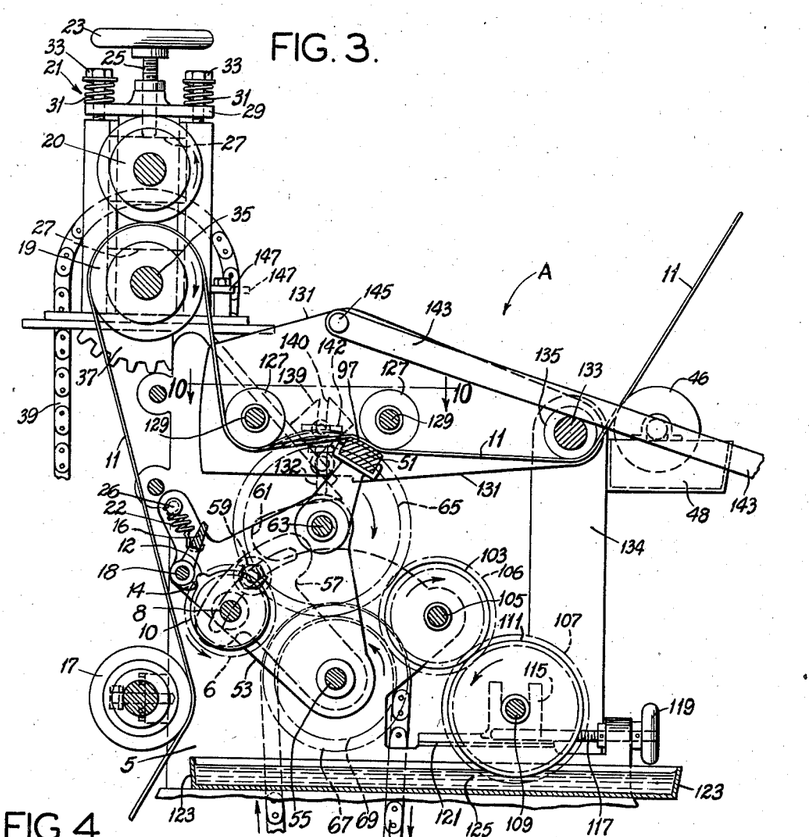
Fig. 3 is an enlarged detailed inside elevation of an adhesive applying mechanism, viewed as in Fig. 1, a certain outside sector arm being shown in dotted lines.

The shaft 35 supporting the lower draw roll 19 is driven from a sprocket 37 and chain drive 39 from a lower sprocket 41 (Figs. 1 and 3). The lower sprocket 41 is on a shaft 42 which is driven by a chain drive 43 from a shaft 45. The shaft 45 is driven by a belt drive 47 from a motor 49. Thus is provided means for drawing paper from the supply 9 into the upper part of the adhesive-applying apparatus A.

Mounted for rotation with a shaft 63 is a ply pasting bar 51. Shaft 63 is located in a swinging frame 53, pivoted on a shaft 55 which is carried in frame 5. Outside of the frame 5, the shaft 55 is provided with a sector arm 57 by means of which the swinging frame 53 may be adjusted to any desired angular position. A locking bolt 59 holds the assembly in any desired angular position. Suitable slots 61 in the adjacent part of the frame 5 accommodate adjustment movement of the shaft 63. From the above it is clear that the shaft 63 supports elements for the rotary ply pasting bar 51 and is itself supported in the swinging frame 53.

Figure 11:
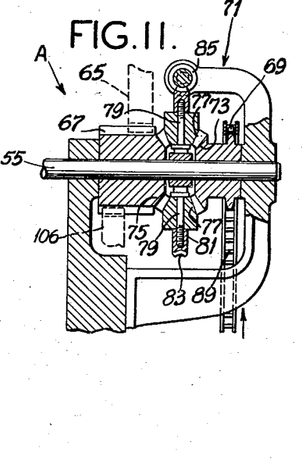
Fig. 11 is an enlarged fragmentary vertical section taken on line 11—11 of Fig. 2.

A gear 65 (Fig. 3) is carried on the shaft 63 and meshes with a drive gear 67 carried on the shaft 55 (Fig. 11). This gear 67 is driven from a sprocket 69 through an ordinary differential gear 71 shown in Fig. 11. This gear consists of a driving bevel gear 73, a driven bevel gear 75 and intermediate bevel pinions 77 which are on radial pins 79 carried on a rotary ring 81, the latter being cut on the outside as a worm wheel 83. This worm 83 meshes with a worm 85 having a rotary adjustment from a hand wheel 87. The purpose of the differential is to allow for advancing or retarding the motion phase of the surface of the ply pasting bar 51 with respect to the web 11 while the bar is rotating. Any given adjustment is held because although the worm 85 may set the wheel 83, the wheel 83 cannot reversely move the worm 85. Hence the bar 51 may properly be angularly phased by adjustment from the wheel 87, any given adjustment being maintained. The wheel is dotted to indicate that alternative photo-electric control apparatus could be used at this point.

Sprocket 69 is driven by means of a chain 89. The chain 89 is driven from a variable-speed transmission gear box 91 and the latter is driven from the shaft 45 by means of a separate chain drive 93. Gear boxes such as 91 are known, for example, see Link Belt Company so-called "PIV" gear referred to in its catalog book number 1574, 1939 edition. Changes in the speed ratio through the box 91 may be effected from a hand control device shown at 95 (see page 35 of said catalog for details). Thus from the device 95 may be controlled the speed of the rotation of the bar 51, and from the handle 87 its phase position may be changed. This provides for locating and spacing impressions of adhesive on the web 11.

The surface of the ply pasting bar 51 is a segment of a cylinder as indicated at 97, the shape being in accordance with the pattern of adhesive desired to be placed on the web 11 by the bar. In the present case this is a rectangle.

At numeral 103 is shown an idler adhesive roll supported on a shaft 105 which is supported in bearings 8 on the frame 5. This roll 103 is driven from a gear 106 on shaft 105. The gear 106 meshes with the pinion 67 of shaft 55 (Fig. 11). The gear 106 also drives gear 107 on shaft 109 supporting an adjacent adhesive pick-up roll 111. The latter 111 is carried on a shaft 109 which is supported in sliding bearing 115 under control of screws 117 which are adjustable from handles 119. The bearings 115 slide at supports 121.

Beneath the roll 111 is located a removable pan 123 for a suitable adhesive 125 (such as melted asphalt) into which the roll 111 dips. The direction of rotation are shown in Fig. 3 from which it will be seen that the roll 111 picks up adhesive and delivers it to the roll 103 from whence it is delivered to the surface of the moving ply pasting bar 51, each time that the bar comes around tangent to the roll 103.

Figure 4:
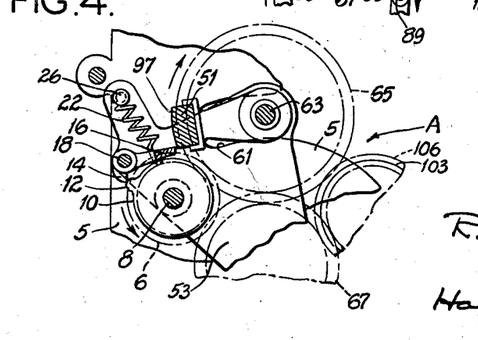
Fig. 4 is a fragmentary view of part of Fig. 3, showing alternate positions of certain parts.

In order to make a clean-cut trailing edge (eliminate tails) of adhesive on the ply pasting bar 51, the mechanism of Fig. 4 is employed. This de-tailing mechanism consists in a gear 6 driven from gear 65 and mounted on a rotary shaft 8 in the adjustable frame 53. Shaft 8 carries a cam 10 which has a lug 12 engageable with a dog 14 of a rocking de-tailing or wiper bar 16. The bar 16 rocks on a shaft 18 also carried on said rocking frame 53. Gears 65 and 6 are phased so that each time the ply pasting bar 51 arrives at about the position shown in Fig. 4, the de-tailing bar 16 will swing tangent to its trailing edge, thereby knocking off any trailing tail of adhesive and making a clean cut rear edge of adhesive on said ply pasting bar when it meets web 11. A spring 22 returns the de-tailing bar to the position shown in Fig. 3 after each operation by the lug 12. The anchor 26 of the spring is carried on the rocking frame 53.

In order to transfer the adhesive from the ply pasting bar 51 to the passing web 11, the latter is caused to pass under two spaced idler rollers 127 which are carried on shafts 129 located in a vertically swinging cradle 131, the latter being pivoted on a fixed shaft 133 on fixed supports 134. The pivot shaft 133 also carries an idler roller 135 under which the web 11 is threaded.

Figure 10:
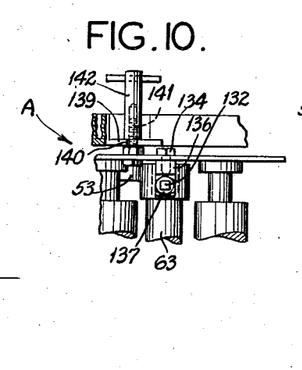
Fig. 10 is a horizontal detail section taken on line 10—10 of Fig. 3.

In normal operation, the cradle 131 is swung down into the position shown in Fig. 3, wherein the reach of the web 11 between the rolls 127 is pressed into an arcuate shape over the ply pasting bar 51, each time the bar passes. The tangential velocity of the bar is equal to that of the web 11 and hence transfer of adhesive is made in lateral bar shapes such as is shown at 28 in Fig. 5. The descent of the cradle 131 is limited by rotary and axially adjustable jack screws 132 (Fig. 10). These are threaded through rotary pieces 136 adapted to be adjusted and clamped to the cradle 131 by bolts 134. Thus rotary pieces 136 may be locked in any angular position desired and the jack screws 132 may in turn be axially adjusted in the rotary pieces. The purpose of the rotary support jack screw 132 is to permit the lower end of the respective jack screw to find a suitable rest on the frame 53 which, it will be remembered, is angularly adjustable. A lock nut 137 maintains given axial adjustments of screw 132.

A slotted extension 139 from the frame 5 accommodates a lock screw 141 to which is threaded a clamp 142 of the cradle 131, so that when the cradle is placed in its downward position shown in Fig. 3, it may be held by screwing up clamp 142 at a suitable location of the screw 141 in the slot 140 of extension 139.

The cradle 131 is adapted to be rocked upwardly by the handle 143, pivoted at 145 on the cradle and having a fulcrum on the shaft 133. Thus when the handle is swung clockwise, the cradle 131 may be lifted so as to disengage the traveling web 11 from the rotary ply pasting bar 51. To hold the cradle in the lifted position, a pivoted latch 147 is provided.

The purpose of placing the rotary mechanism of the ply pasting bar 51 in a swinging frame such as 53 is to allow for replacement of the bar in different radial sizes and at the same time for bringing any replacement bar into juxtaposition with respect to the idler adhesive roll 103. This replacement provides for different spacings of the adhesive bars on the web 11.

It will also be seen that the frame 53 when rocked laterally moves the rotary ply pasting bar, while the cradle 131 is moved generally vertically. That is, the movements of the two are substantially at right angles so that regardless of what the radius is which the ply pasting bar operates on, the spaced rollers 127 will straddle the bar with the web therebetween.

Figure 5:
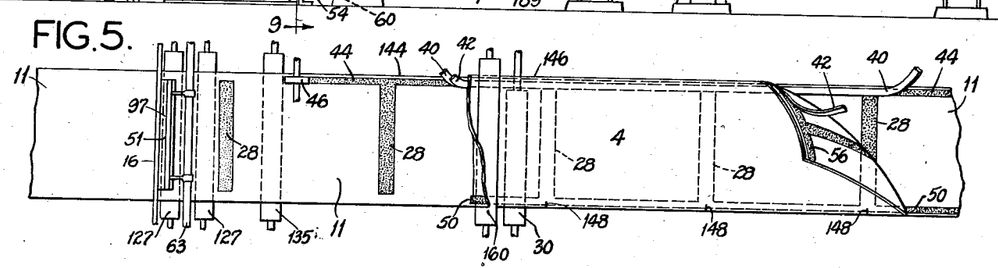
Fig. 5 is an exploded diagrammatic section viewed from below, being taken on line 5—5 of Fig. 1.

The above construction results in application of the adhesive bars 28 to the bottom of the web 11 as shown in Fig. 5. To prevent application of adhesive impressions from the bar 51 to the web 11, the cradle 131 needs only to be lifted. Pressure at this time is taken off the draw roll 27 so that the web feed is at this time stopped.

Referring now to the drying section C this consists broadly in a supporting frame 151 for rotary idling and drying drums 153 carried in bearings 152. The web 11 is threaded over rolls 153 as shown. Before the web 11 approaches the drums, it is brought into juxtaposition with the second web 4. This second web 4 is introduced from beneath, that is roll 2, over a first idler roller 154 and a second idler roller 155, where it is impressed with certain adhesive stripes to be described, after which it passes up to and over a relatively long ironing roller 160 and under a shorter gravity ironing roller 30. Both of the latter are in laminating unit B. The roller 30 has gudgeons in slotted members 32 for gravity action against the material coming in over the roll 160. Roller 30 is shorter than roller 160 as indicated in Fig. 5 for purposes which will appear.

On a bracket 34 having portions extending a short distance in between webs 11 and 4 are supply rolls 36 and 38 of protective tapes 40 and 42. The tapes are fed in between the adjacent edges 144 and 146 of the webs 11 and 4 respectively, said edges being slightly offset to provide for easy opening of the finished bags. These tapes are to cover longitudinal adhesive stripes, the application of which is now to be described.

One stripe 44 (Fig. 5) is applied to the web 11 by means of a roller 46 mounted on one of the brackets 134 (Figs. 1 and 3), the roller 46 dipping into adhesive in a supply tray 48 and contacting the bottom of the web. In Fig. 1 the stripe 44 is on the bottom of web 11 and at its edge nearest the reader. Fig. 5, it will be remembered, is upside down, being viewed from the bottom side of Fig. 1. Stripe 44 is applied in the plane of the tape 40 so that it is covered thereby before passing the rolls 30 and 160.

Figure 9:
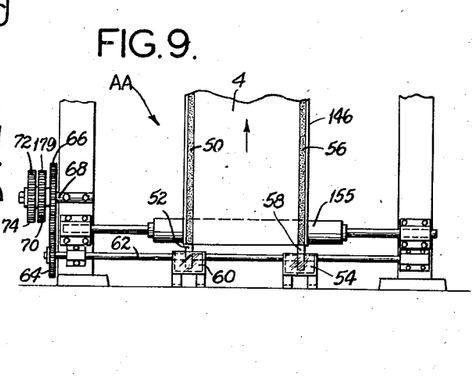
Fig. 9 is a vertical section taken on line 9—9 of Fig. 1.

An ultimately adjacent stripe 56 is applied on the web 4 by means of an adhesive roller 58 (Fig. 9), which roller 58 dips into an adhesive tray 54. This stripe is positioned in the plane of the stripe 44 and tape 42 and is covered by the latter in passing the rollers 30 and 160.

A third stripe 50 of adhesive is applied near the opposite edge of the web 4 by adhesive roller 52 dipping into an adhesive trough 60. This stripe passes up with the web 4 but is not covered by tape and meets web 11 to form a longitudinal pasted bottom-forming seam connecting with the bars of adhesive 28 which form pasted side seams for bags or case liners which are later to be cut from the webs. The adjacent stripes 44 and 56 are also potential seam formers, except that they are covered by the tape 40 and 42 so as to prevent bag closure until the bag has been filled and the tapes 40 and 42 stripped off.

It will be noted that the stripe 44, tapes 40 and 42 and the stripe 56 are all in one plane and that the roller 30 (Fig. 5) has been shortened so as to avoid pressure in this plane. Throughout the remainder of the lengths of the ironing rollers 30 and 160 pressure is applied to the web. Thus the web is ironed and the seams pressed shut except at the covered stripes, thus leaving open the resulting bags.

The roll 155 (Fig. 9) is an idler roll but the adhesive rolls 52 and 58 are power-driven, being located on a shaft 62 provided with a gear drive 64. The gear 66 of this drive is on a shaft 68 which is driven by means of a chain drive 179 from the shaft 45. The driven sprocket is shown at 70.

An adjacent sprocket 72 motivates a chain drive 74 which drives a rearward shaft 76. Another chain drive 78 leads from the chain drive 76 to the unit D.

Figures 6, 7, 8:
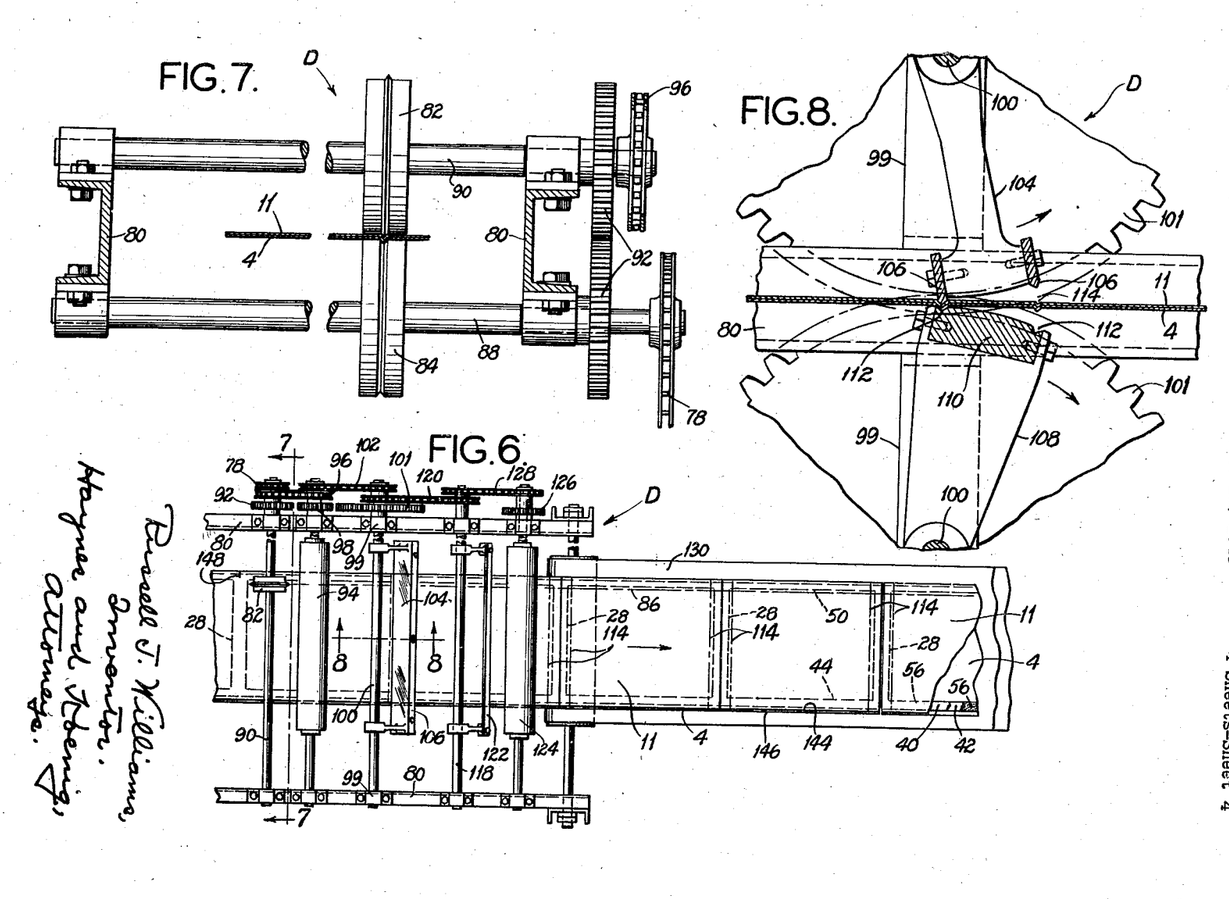
Fig. 6 is an ideal section viewed from line 6—6 of Fig. 1.
Fig. 7 is an enlarged section taken on line 7—7 of Fig. 6.
Fig. 8 is an enlarged fragmentary longitudinal section taken on line 8—8 of Fig. 6.

This unit D consists of a sloping bed 80 which has suitable bearings for the following elements:

The first element on top of the bed 80 consists of a pair of male and female creasing or scoring rolls 82 and 84 respectively (Fig. 7). These cooperate to produce a score line 86 just within the stripe 50. The lower female roll 84 is on a shaft 88 driven from said chain drive 78. Roll 82 is on a shaft 90 which is driven from shaft 88 through gears 92.

At 94 is shown a pair of draw rolls chain-driven from shaft 90 by means of a chain drive 96 and geared together as indicated at 98. These rolls 94 draw the web through the creaser rolls 82 and 84.

At 99 (Figs. 1, 6 and 8) are brackets for supporting rotary shafts 100 geared together as indicated at 101 and chain-driven as indicated at 102. Fig. 8 shows certain details of these elements. The upper half of this device is constituted by a turning frame 104 on which are spaced male scoring blades 106. The lower half is constituted by a turning frame 108 having a block 110 therein with female scoring recesses 112 cooperating with the blades 106 to operate upon the combined webs 4 and 11 to produce lateral score lines 114. These score lines embrace the adhesive seam areas 28.

Figure 2:
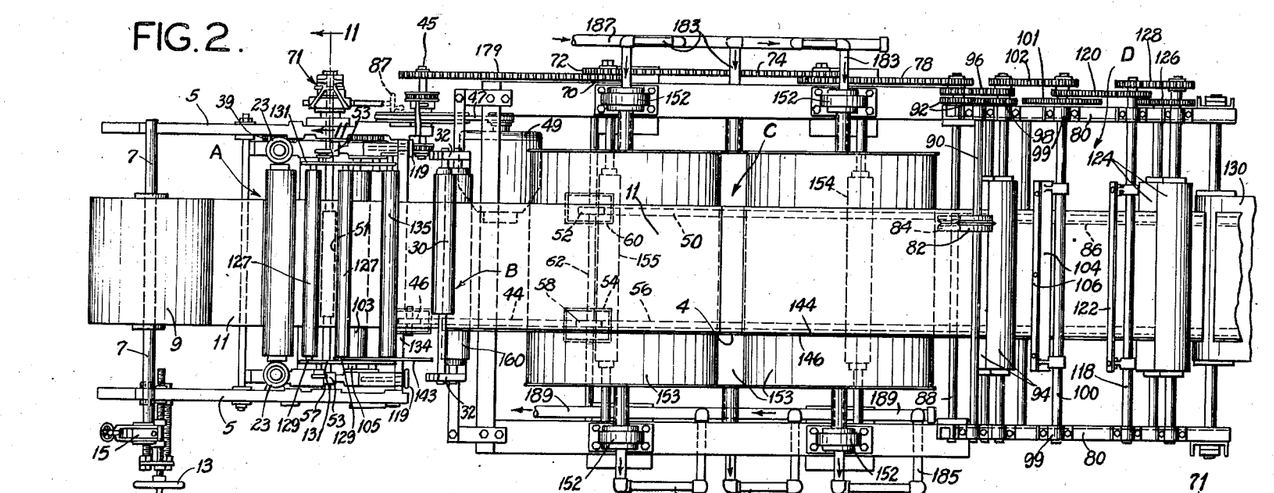
Fig. 2 is a plan view of Fig. 1.

The next element on D is a cutter which is constittued by a fixed blade 116 mounted beneath the frame 80 and under the passing web (Figs. 1, 2 and 6). Above the frame 80 at this point is a shaft 118 chain-driven as indicated at 120 and carrying a rotary blade 122. This rotary blade cooperates tangentially with the fixed blade 116 to cut the web at intervals and at median locations within the adhesive areas 28.

The separated segments of the composite web material are received by upper and lower draw rollers 124 which are geared together as indicated at 126 and chain-driven as at 128. These rollers 124 project the separated bag-forming web elements onto a take-off belt as shown in 130 for subsequent stacking.

The articles which are thus produced are claimed per se in a co-pending patent application of Charles V. Brady and myself, Serial No. 508,534, filed November 1, 1943, for Bag structures and process of manufacture. It consists of a structure which may become a bag per se or a case liner having side seams made from the adhered webs at the adhesive which was originally applied at 28. This structure has a closed bottom seam made by parts of the stripe 50. It has also an open mouth with adjacent tape-covered adhesive stripes. These stripes are respectively covered by the tapes. Since the adhesive used is permanently tacky asphalt, these cover tapes 40 and 42 prevent the adjacent stripes from sticking together until the tapes are ripped off which is done after the article is filled.

It will be understood that other adhesives than asphalt may be used but asphalt is satisfactory because it may be compounded to be permanently tacky. If asphalt is used, the various adhesive containers therefor are suitably warmed by electric heaters or the like (not shown) to maintain it in a fluid enough condition to make the applications above indicated. It will be also understood that any of the adhesive applying rollers such as 46, 52 and 58 may or may not be power-driven, because with many types of adhesives an idler roller for adhesive application is satisfactory.

It is also to be understood that with certain adhesives it may be possible to dispense with the drying rolls 153, in which event the web after assembly may be led directly from the unit B to the unit D.

The drums 153 are driven only by the webs 11 and 4 and do not drive that web. This simplifies the mechanical structure and prevents wrinkling of the web. They are not used as pressure rolls which heretofore favored wrinkling.

The rolls 153 are supplied through suitable glands and bearings with a heating fluid, such as steam or hot water, the inlet lines being shown at numeral 183 and the outlet lines at 185. Supply and exhaust headers are shown at 187 and 189, respectively. Instead of heating the idler drying rolls 153 they may be supplied with a cooling medium should the character of the adhesive require it for setting purposes.

The sequence of operations is as follows:

Paper webbing 11 and 4 is drawn simultaneously from the rolls 9 and 2 respectively and comes together at the ironing rolls 30 and 160. The web 11 during advance from roll 9 to the pressure rolls, receives the spaced laterally positioned rectangular bars of adhesive 28 and also the stripe 44.

The web 4 as it approaches the rolls 30 and 160 receives the stripe 56 in the plane of stripe 44. Stripes 56 and 44 are covered by tape 42 and 40 respectively, the tapes being contiguous and between the webs 11 and 4.

At the ironing rolls the two webs 11 and 4 are pressed together over the regions covering adhesive bars 28 and stripe 50, thus completing a sequence of U-shaped seams. The stripes 44 and 56, and tapes 40 and 42 are not pressed because the roller 30 is short.

The composite web thus organized passes over the heated rolls 153 and the adhesive is transformed from a liquid to a more solid but preferably permanently flexible and tacky form.

Finally the web passes through unit D where it is scored (both longitudinally at 86 and laterally at 114) and is finally cut apart through the bars 28. The result is a series of bag-like structures having pasted side seams and bottom seams within which are score lines for folding over of the seams. The purpose of this is to allow infolding of these seams for increasing strength as particularized in the patent application above mentioned. The tape-covered adhesive within the mouth allows for filling without damage to the adhesive. After filling the tapes may be removed, thus exposing opposite stripes 44 and 56 of tacky adhesive which may be pressed together for closure.

The device shown at 138 (Fig. 1) is a register printer which is timed with the ply pasting apparatus to imprint register marks 148 on the outside of the plies over the bars 28. This register printer is not new per se and details are therefore not shown. Its use permits of rolling up the composite web before segmenting it as at the cutter 122. Thereafter it may be unrolled for segmentation, as by passing through photoelectric cutting apparatus responsive to the imprints for properly timing an electric cutter to sever at the bars 28. I do not claim the electric cutting per se but mention it to show that the invention contemplates cutting means equivalent to that shown at 122.

It will of course be understood that if the scoring 86 and 114 is not desired, this operation may be eliminated by removal of the scoring rolls 82 and 84.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Laminating apparatus comprising means for progressively bringing together two webs of material from separate sources, means for applying spaced lateral bars of adhesive on the one web, means for applying a continuous stripe of adhesive near one edge of said web, said stripe joining one set of ends of said bars, means for applying two adhesive stripes respectively near opposite edges of the other web, one of said last-named stripes being in the plane of the stripe on the first-named web, and means for bringing said webs together while in motion with said adhesive located between the webs.

2. Laminating apparatus comprising means for progressively bringing together two webs of material from separate sources, means for applying spaced lateral bars of adhesive on the one web, means for applying a continuous stripe of adhesive near one edge of said web, said stripe joining one set of ends of said bars, means for applying two adhesive stripes respectively near to opposite edges of the other web, one of said last-named stripes being in the plane of the stripe on the first-named web, means for bringing said webs together while in motion with said adhesive located between the webs, and means for introducing a pair of tapes at the point where the webs are brought together and in the plane of said coplanar stripes.

3. Laminating apparatus comprising moving guiding means for progressively moving together two plies of material from separate sources, a rotary ply pasting bar adapted to imprint spaced lateral bars of adhesive on the inside of one ply as it moves, roller means adapted to imprint a continuous stripe of adhesive on one side of the inside of said ply after imprinting of the bars, said stripe being located to join one set of ends of said bars, roller means for imprinting two adhesive stripes respectively near to opposite edges of the other ply, one of said last-named stripes being in the plane of the stripe on the first-named ply, means for bringing said plies together while in motion with said adhesive located between the webs, and means for supplying and introducing a pair of tapes at the point where the webs are brought together and in the plane of said coplanar stripe.

4. Laminating apparatus comprising means for progressively bringing together two webs of material from separate sources, means for imprinting spaced lateral bars of adhesive on the inside of one web, means for imprinting a continuous stripe of adhesive on the inside of said web, said stripe being located to join one set of ends of said bars, means for applying two additional stripes respectively near the opposite edges of the inside of the other web, one of said last-named stripes being in the plane of the stripe on the first-named web, means for bringing said webs together while in motion, means for introducing a pair of tapes at the point where the webs are brought together and in the plane of said coplanar stripe, means for longitudinally continuously scoring the resulting composite web within the first-mentioned stripe, means for scoring said web laterally on each side of each of said bars, and a cutter adapted to segment the webs along lines within the space bars.

5. Laminating apparatus comprising means for progressively bringing together two webs of material from separate sources, means for imprinting spaced lateral bars of adhesive on the inside of one web, means for imprinting a continuous stripe of adhesive on the inside of said web, said stripe being located to join one set of ends of said bars, means for applying two additional stripes respectively near the opposite edges of the inside of said other web, one of said last-named stripes being in the plane of the stripe on the first-named web, means for bringing said webs together while in motion, means for introducing a pair of tapes at the point where the webs are brought together and in the plane of said coplanar stripes, and a cutter adapted to segment the webs laterally within the spaced bars of adhesive.

6. Laminating apparatus comprising means for progressively bringing together two webs of material from separate sources, means for imprinting spaced lateral bars of adhesive on an inside of one web, means for imprinting a stripe of adhesive on said inside of said web, said stripe being located to join one set of ends of said bars, means for applying two additional stripes respectively near the opposite edges of the inside of said other web, one of said last-named stripes being in the plane of the stripe on the first-named web, means for bringing said webs together, means for introducing a pair of tapes at the point where the webs are brought together and in the plane of said coplanar stripe, and cutter means for segmenting said webs along lines within the said lateral spaced bars of adhesive.

7. Laminating apparatus comprising means for moving two webs of material from two separate sources, means for bringing said webs together at a predetermined point, a rotary-ply paster adapted to apply spaced laterally located bars of adhesive on the inside of one of said webs, means for applying a stripe of paste along one edge of said one web which connects certain ends of said paste bars, said bars and stripe being applied before said one web reaches the other, means for applying stripes of paste to the other web on the side adjacent to said one web before reaching said point, one of said last-named stripes being in the plane of the stripe on the other web, and means for inserting a pair of tapes in between said webs as they approach one another at said point and in the plane of the first-mentioned stripe whereby it and the adjacent stripe of adhesive on the other web are separated although located within the laminated web.

8. Laminating apparatus comprising means for moving two webs of material from two separate sources, means for bringing said webs together at a predetermined point, a rotary-ply paster adapted to apply spaced laterally located bars and adhesive on the inside of one of said webs, means for applying a stripe of paste along one edge of said one web connecting certain ends of said paste bars, said bars and stripe being applied before said one web reaches the other web, means for applying stripes of paste to the other web on the side adjacent to said one web before reaching said point, one of said last-named stripes being in the plane of the stripe on the other web, means for inserting a pair of tapes in between said webs as they approach one another at said point and in the plane of the first-mentioned stripe whereby it and the adjacent stripe of adhesive on the other web are separated although located within the laminated web, and means for pressing together said webs at regions including substantially all of the paste areas except the paste areas under said tapes.

9. Laminating apparatus comprising means for moving two webs of material from two separate sources, means for bringing said webs together at a predetermined point, a rotary-ply paster adapted to apply spaced laterally located bars and adhesive on the inside of one of said webs, means for applying a stripe of paste along one edge of said one web connecting certain ends of said paste bars, said bars and stripe being applied before said last-named web reaches the other, means for applying stripes of paste to the inside of the other web before it reaches said point, one of said last-named stripes being in the plane of the stripe on the other web, means for inserting a pair of tapes between said webs as they approach one another at said point and in the plane of the first-mentioned stripe whereby it and the adjacent stripe of adhesive on the other web are separated although located within the laminated web, means for pressing together said webs at regions including substantially all of the paste areas but excluding the paste areas under said tapes, and means for cutting the resulting composite web along lateral lines located within the paste bars.

10. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, and said tapes being fed into the combining means coplanar with last-named stripes and between them.

11. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, said tapes being fed into the combining means coplanar with last-named stripes and between them, and said combining means being adapted to press the webs together except in the plane of said coplanar stripes and tapes.

12. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, said tapes being fed into the combining means coplanar with last-named stripes and between them, rotary drums over which the composite web formed by the combining means is threaded, scoring means adapted to score the composite web as it leaves said drums at a line on the web adjacent to said bottom-forming stripes, draw rolls for pulling the composite web over said drums and through the scoring means, and scoring means beyond said draw rolls adapted to score the composite web laterally and adjacent to both sides of the spaced adhesive bars.

13. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, said tapes being fed into the combining means coplanar with last-named stripes and between them, rotary drums over which the composite web formed by the combining means is threaded, scoring means adapted to score the composite web as it leaves said drums at a line on the web adjacent to said bottom-forming stripes, draw rolls for pulling the composite web over said drums and through the scoring means, scoring means beyond said draw rolls adapted to score the composite web laterally and adjacent to both sides of the spaced adhesive bars, and cut-off means beyond the last mentioned scoring means adapted to segment the composite web laterally along line through said spaced adhesive bar.

14. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, said tapes being fed into the combining means coplanar with last-named stripes and between them, rotary drums over which the composite web formed by the combining means is threaded, scoring means adapted to score the composite web as it leaves said drums at a line on the web adjacent to said bottom-forming stripes, draw rolls for pulling the composite web over said drums and through the scoring means, scoring means beyond said draw rolls adapted to score the composite web laterally and adjacent to both sides of the spaced adhesive bars, cut-off means beyond the last mentioned scoring means adapted to segment the composite web laterally along line through said spaced adhesive bar, and delivery rolls adapted to receive the segmented composite web for delivery.

15. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, said tapes being fed into the combining means coplanar with last-named stripes and between them, rotary drums over which the composite web formed by the combining means is threaded, scoring means adapted to score the composite web as it leaves said drums at a line on the web adjacent to said bottom-forming stripes, draw rolls for pulling the composite web over said drums and through the scoring means, scoring means beyond said draw rolls adapted to score the composite web laterally and adjacent to both sides of the spaced adhesive bars, cut-off means beyond the last mentioned scoring means adapted to segment the composite web laterally along line through said spaced adhesive bar, and delivery rolls adapted to receive the segmented composite web for delivery, said combining means being adapted to press together substantially all parts of the composite web with the exception of those longitudinal parts adjacent to the tapes and the stripes coplanar therewith.

16. Bag forming apparatus comprising separate supplies of webbing, combining means, means for moving separate webs from the supplies and through said combining means, separate tape supply means, means for feeding tapes from said tape supply into the combining means and between said webs, means for applying spaced bars of adhesive and a bottom-forming adhesive stripe between the webs before they reach the combining means, means for applying two other stripes between said webs before they reach the combining means, said last-named stripes being coplanar, said tapes being fed into the combining means coplanar with last-named stripes and between them, rotary drums over which the composite web formed by the combining means is threaded, scoring means adapted to score the composite web as it leaves said drums at a line on the web adjacent to said bottom-forming stripes, draw rolls for pulling the composite web over said drums and through the scoring means, scoring means beyond said draw rolls adapted to score the composite web laterally and adjacent to both sides of the spaced adhesive bars, cut-off means beyond the last mentioned scoring means adapted to segment the composite web laterally along line through said spaced adhesive bar, and delivery rolls adapted to receive the segmented composite web for delivery, said combining means being adapted to press together substantially all parts of the composite web with the exception of those longitudinal parts adjacent to the tapes and the the tape stripes coplanar therewith.

RUSSELL J. WILLIAMS.